United States Patent [19]

Hashimoto

[11] Patent Number: 4,811,383

[45] Date of Patent: Mar. 7, 1989

[54] MESSAGE EXCHANGE DEVICE FOR COMMUNICATION BETWEEN A MANAGER AND PARTICULAR PERSONS

[75] Inventor: Kazuo Hashimoto, Tokyo, Japan

[73] Assignee: Hashimoto Corporation, Tokyo, Japan

[21] Appl. No.: 860,621

[22] Filed: May 6, 1986

[30] Foreign Application Priority Data

May 7, 1985 [JP] Japan ............................ 60-96458

[51] Int. Cl.$^4$ ............................................ H04M 1/65
[52] U.S. Cl. ............................... 379/76; 379/74; 379/77
[58] Field of Search ............... 379/70, 74, 76, 77

[56] References Cited

U.S. PATENT DOCUMENTS

| 4,122,306 | 10/1978 | Friedman et al. | 379/77 |
| 4,194,089 | 3/1980 | Hashimoto | 379/76 |
| 4,320,256 | 3/1982 | Freeman | 379/77 |
| 4,540,856 | 9/1985 | Fujii et al. | 379/77 |

Primary Examiner—Vincent P. Canney
Assistant Examiner—James E. Tomassini
Attorney, Agent, or Firm—Lowe, Price, LeBlanc, Becker & Shur

[57] ABSTRACT

A message exchange device for communication between a manager and particular persons, which is adapted to enable a particular person to listen to a particular message directed to a particular caller and recorded on an associated channel of a multi-channel recording medium, by sending a caller-representative coded signal assigned to him, and then stores that the particular message has been transmitted. Further, the device operates to transmit either one of a first predetermined announcement representing that said particular message has not been listened and a second predetermined announcement representing that said particular message has been listened, in accordance with stored results when a confirming coded signal is transmitted from the manager, and record on the multi-channel recording medium at least one substitute message, which is transmitted from the manager by the use of an external telephone set to be substituted for at least one of said outgoing message and said particular messages when a coded recording signal is transmitted.

2 Claims, 13 Drawing Sheets

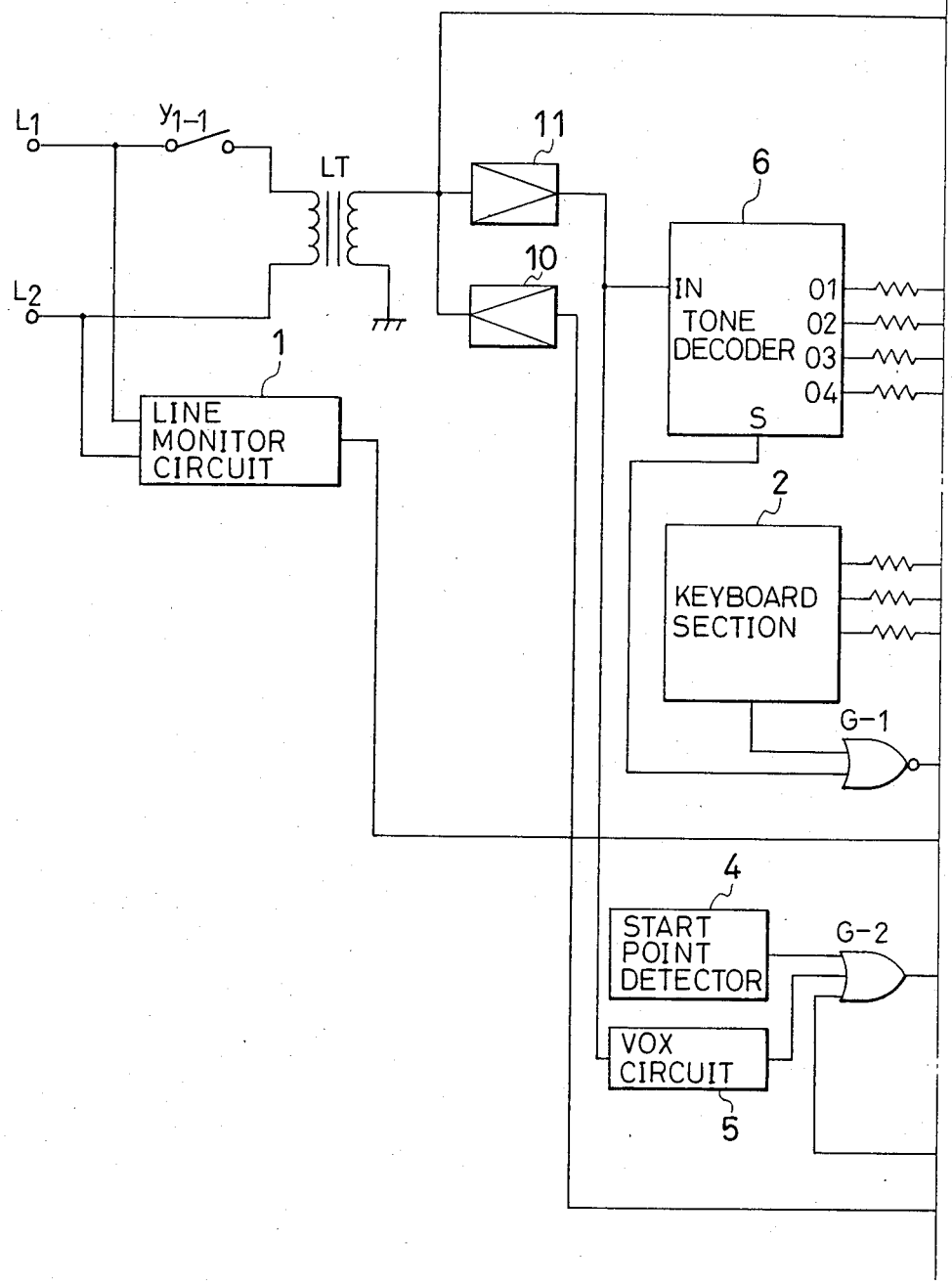

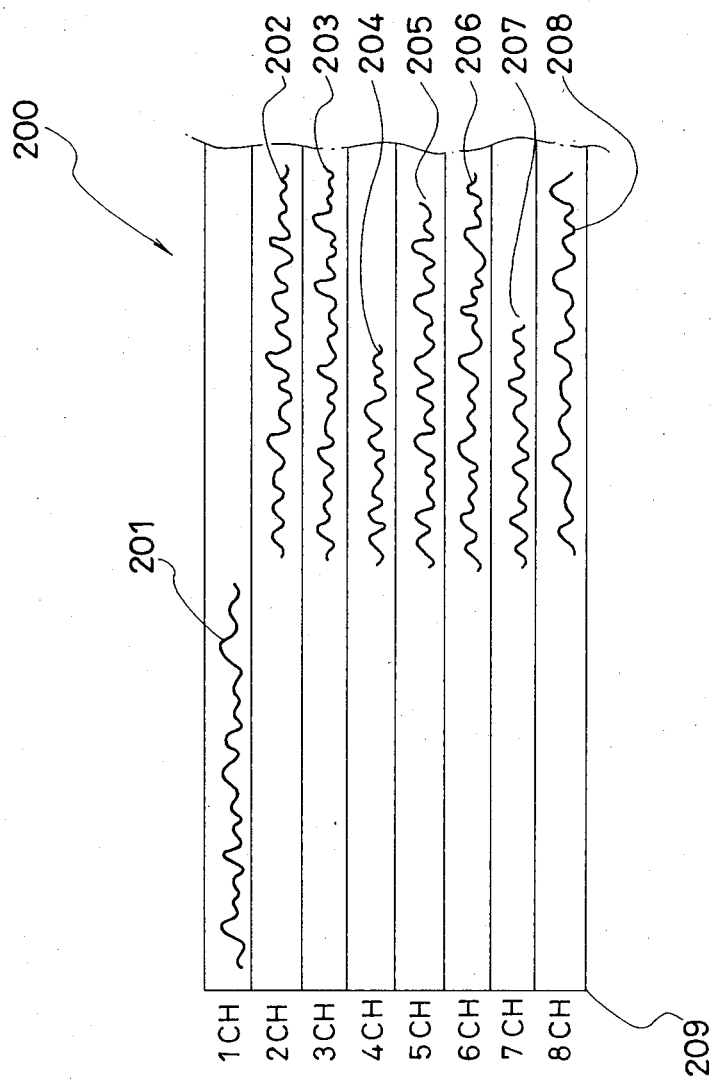

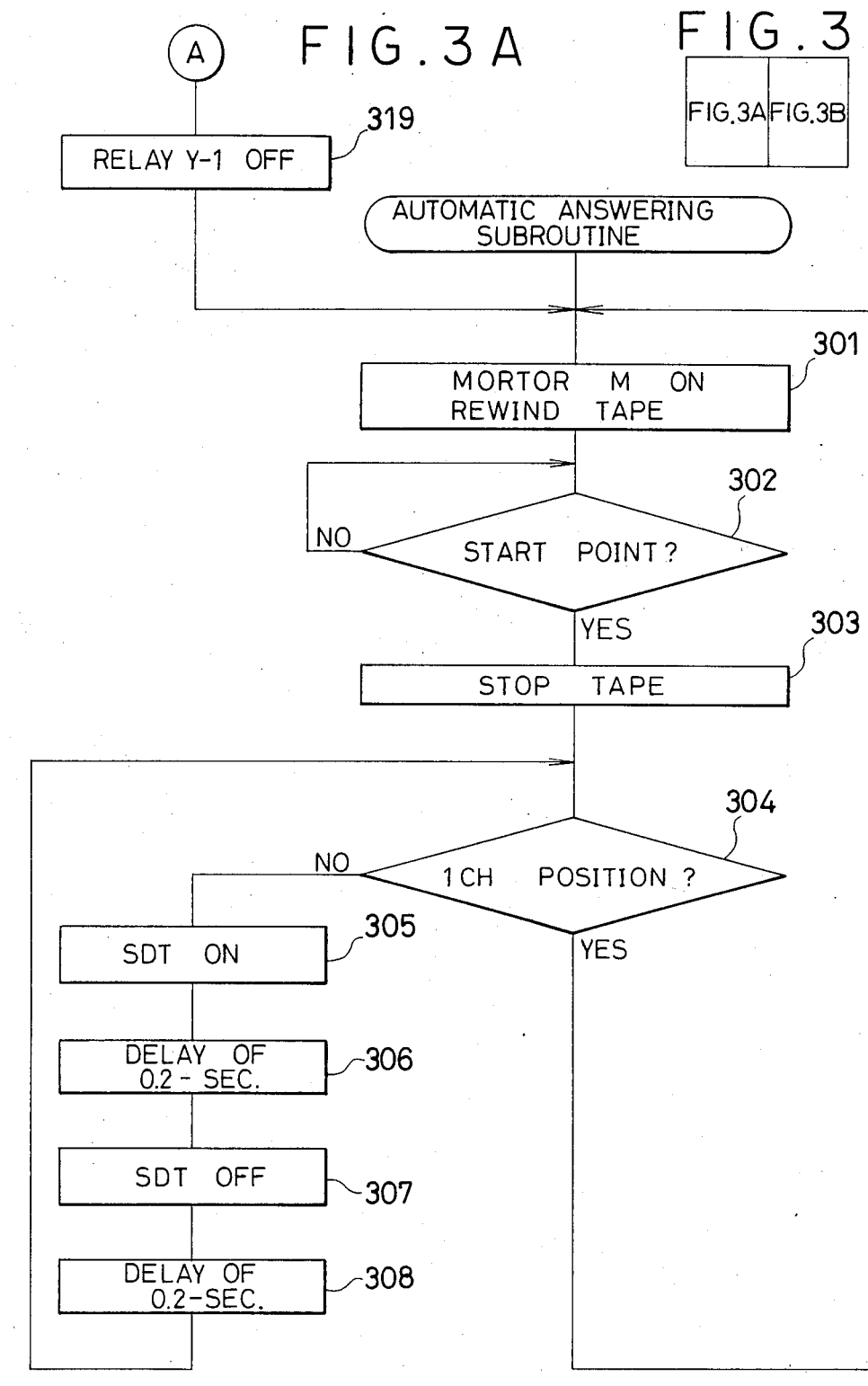

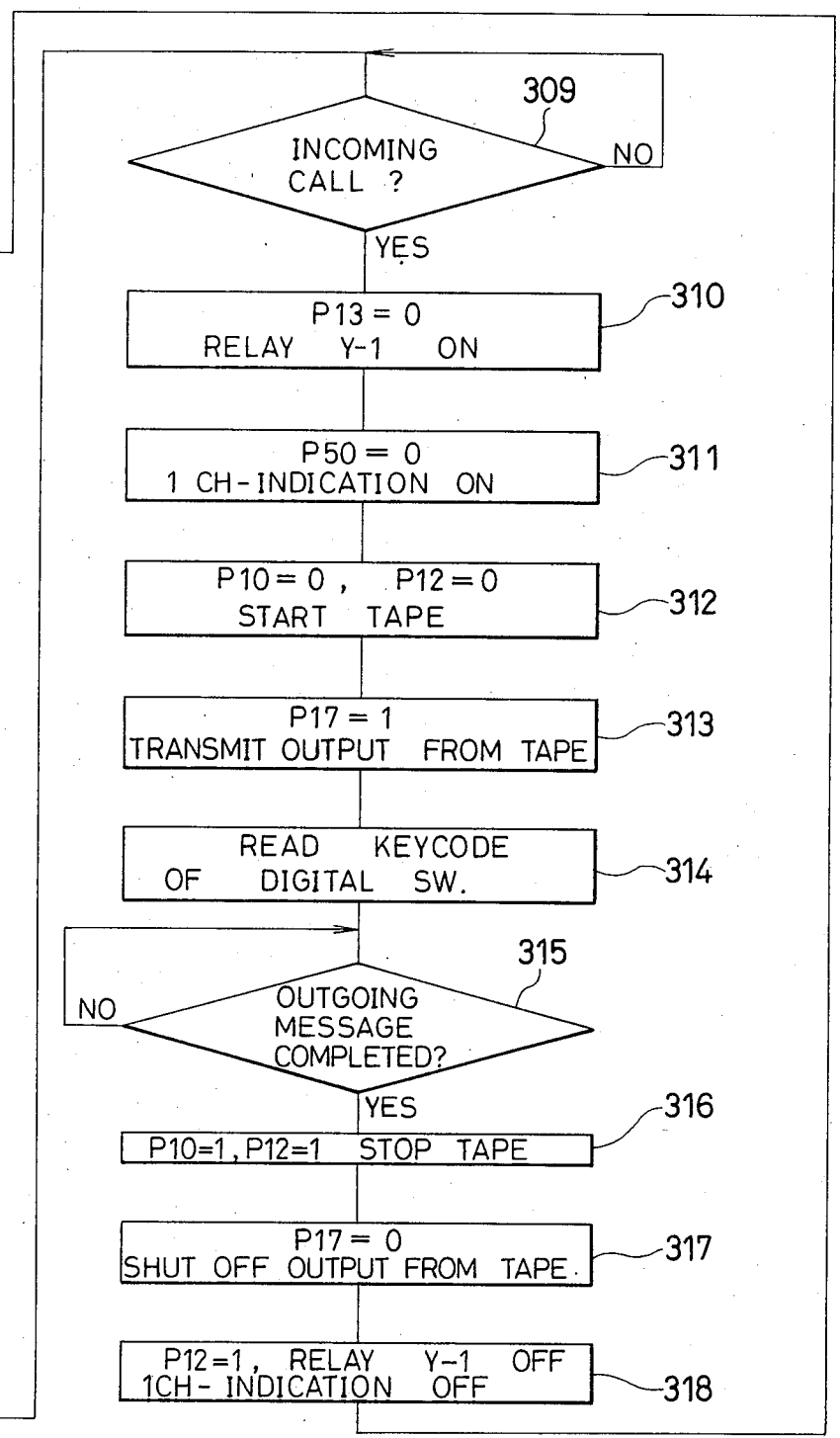

| FIG. 7A | FIG. 7B |

MESSAGE EXCHANGE DEVICE FOR COMMUNICATION BETWEEN A MANAGER AND PARTICULAR PERSONS

BACKGROUND OF THE INVENTION

The present invention relates to a message exchange device for communication between a manager and particular persons such as salesmen.

Conventionally, automatic answering/recording apparatuses for use with a telephone set have been known, which are typically arranged accessible by particular persons such as salesmen away from their office through remote control so that they can listen to prerecorded instructions directed to them. However, conventional apparatuses of this kind cannot surely keep privacy between respective salesmen, in particular, in case that the apparatus is utilized by a considerable number of salesmen, and cannot discriminate whether or not they have listened to instructions and when they listened to same. If an excessively long period of time lapses, with the salesmen do not listen to the instructions, such instructions are no longer useful for them, resulting in inconvenience.

SUMMARY OF THE INVENTION

An object of the present invention is to provide a message exhange device for communication between a manager and particular persons such as salesmen, which is adapted to enable a manager to easily confirm whether or not the respective particular persons have listened to his instructions directed to them, and record his new substitute instructions on a tape mounted in the apparatus.

Another object of the present invention is to provide a message exchange device for communication between a manager and particular persons, which is adapted to automatically page particular persons who have not listened to manager instructions, and enable the manager to page direct such persons.

According to the present invention, a message exchange device for communication between a manager and particular salesmen is provided, which comprises: a first recording means to reproduce and transmit a prerecorded outgoing message upon reception of an incoming call; a listening means which can be listened to manager's instruction or message by any of the salesmen who has called the device and has sent a special personal number from remote location; a first announcing means which announces "not listening yet" message as long as any of the salemen has not listened yet to the manager's instruction when the manager calls back the device for checking from remote location; a second announcing means which announces "listened already" message so long as any of the salesmen has listened to the manager's instruction when the manager calls back the device for checking from remote location; and a second recording means which can record only the manager's instruction or message for any of the salesmen on any channel of a multi-channel recording medium.

Preferably, the message exchange device further includes a timer section for generating an output upon elapse of a predetermined period of time, and a dial signal generator for dialing respective numbers for calling out said particular salesmen, to thereby call out at least one of said particular salesmen who has not listened to said manager's instruction when said predetermined period of time has elaspsed, so as to request him to listen to the same instruction soon.

Accordingly, the message exchange device of the present invention has advantages that it is possible for the manager at a remote location to esily confirm whether or not the respective particular persons such as salesmen have listened to his instructions directed to them, to thereby understand their activity or behavior, and record his new substitute instructions after completion of such confirming operation, and that the device automatically pages particular persons who have not listeded to the manager instructions for too long period of time through portable pagers carried by them, or enables the manager to page direct such particular persons, so as to request them to listen to his instructions soon, thereby greatly improving practicarity of the device of this kind.

BRIEF DESCRIPTION OF THE DRAWINGS

FIGS. 1A and 1B are schematic circuit diagram showing a message exchange device according to an embodiment of the present invention;

FIG. 2 is a fragmentary view showing a recording condition in the respective channels of a multi-channel tape employed for the device of FIG. 1;

FIGS. 3A and 3B are a flowchart of a control program for an automatic answering operation of the device;

DETAILED DESCRIPTION OF THE PREFERRED EMBODIMENT

With reference to the accompanying drawings, a message exchange device according to an embodiment of the present invention will be now explained.

Figure 1B:
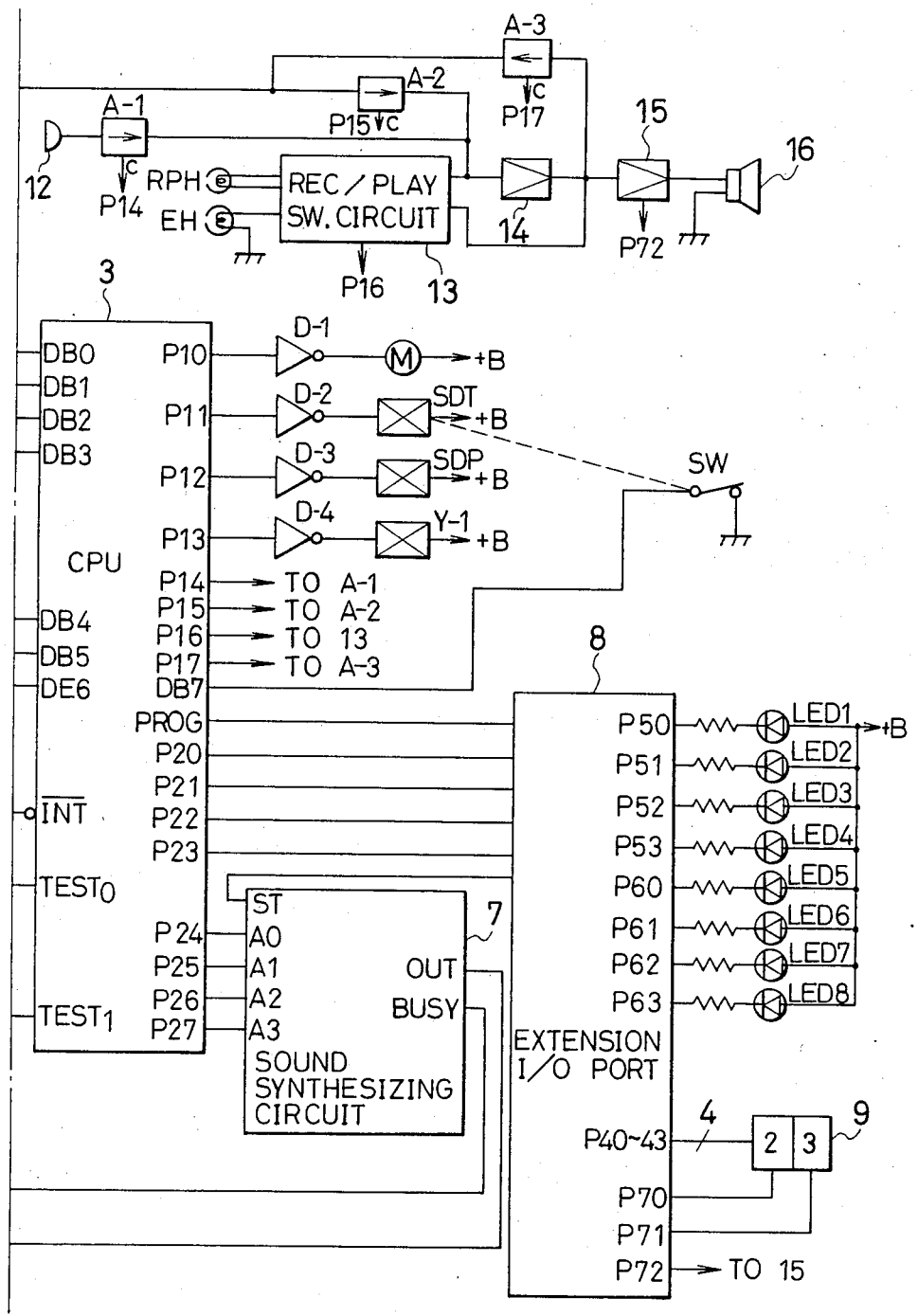

FIGS. 1A and 1B, reference symbols L1, L2 denote telephone lines, LT a line transformer, 1 a line monitor circuit which is adapted to detect an incoming call and monitor an on-hook operation effected by a calling party, 2 a keyboard section which accommodated therein an encoder, and 3 a one-chip microprocessor (hereinafter, referred to as a CPU) consisting of an Intel 8049, in the present embodiment, and having data bus terminals DB0 to DB7 as input ports, and output ports P10 to P17 and P20 to P27. Reference symbols D-1 to D-4 denote drivers connected to the output ports P10 to P13, M a motor, SDT a solenoid which operates to shift a multi-channel head (to be described later) by one-channel each time the solenoid SDT is driven, and SDP a driving solenoid for driving a multi-channel tape (hereinafter referred to as a tape) shown in FIG. 2 at a normal speed, the tape 200 being rewound when the motor M alone is driven.

Further, reference symbol SW designates a switch which is so operated as to assume its ON position when a first channel for an outgoing message 201 (FIG. 2) is selected by operating the solenoid SDT, and reference numeral 6 denotes a tone decoder for decoding a tone sent from a pushphone or key telephone (not shown) as a remote control signal (to be described later) and for supplying an output to the input terminals DB0 to DB3 and a strobe output S to an interrupt terminal INT through an OR gate G-1, so as to supply an interrupt request to the CPU 3.

Connected to the output ports P24 to P27 is a sound synthesizing circuit 7, which is so arranged as to generate synthesized sounds "0", "1", ---, "9", "channel message has been already transmitted" and "channel message has not been transmitted as yet" in accordance with an address A0-A3, when a pulse is supplied to the start terminal ST after specifying the address A0-A3. Reference numeral 8 designates an extension I/O port having output ports P50 to P53 and P60 to P63 connected to the light-emitting diodes LED1 to LED8 and arranged so that the light-emitting diode LED1 is turned on upon reception of an incoming call whereas the light-emitting diode LED 2 is turned on when a particular person accesses the device through remote control (to be described later) to listen to manager instructions (particular message) recorded on the tape 200 at an associated channel such as a second channel, for instance. Reference numeral 9 denotes a two-digit digital switch which is adapted to supply a 4-bit output to the input ports P40 to P43 of the extension I/O port 8, and the higher digit thereof is read by the CPU 3 operated input processing mode, with the output port P70 set at logic "1", and the lower digit thereof is read, with the output port P71 set at logic "1". This two-digit code serves as a key code for remote control, in other words, the remote control is rendered executable when the buttons of the pushphone are depressed, which corresponds in number to the two-digit code. Further, reference numerals 10 and 11 denote amplifiers, 12 a microphone utilized for recording the outgoing message 201 and the particular message 202 to 208 shown in FIG. 2, 13 a REC/PLAY switching circuit, 14, 15 amplifiers, 16 a loudspeaker, and A-1 to A-3 analog switches through which a signal flows in the direction shown by an arrow when a control terminal c is set at logic "1".

In the following, the operation of the message exchange device as constructed above will be explained with reference to FIGS. 3 to 8.

First, the user operates a recording button (not shown) arranged in the keyboard section of FIG. 1 to record on the multi-channel tape 200 of FIG. 2 an outgoing message 201 at a location shown in FIG. 2 of the first channel of the tape 200, and particular messages 202 to 208 at respective locations in FIG. 2 of the second channel to a maximum channel (the eighth channel, for instance). Next, the user depresses a button for automatic answering/recording operation (which is generally called as an AUTO button), to set the message exchanging device in its standby mode for reception of an incoming call.

FIGS. 3A and 3B show a series of automatic answering operations, which is executed upon reception of an incoming call from an unspecified third party after depression of the AUTO button. When the user depresses the AUTO button, the program enters step 301 to switch a level at the output port P10 of the CPU 3 from logic "1" to logic "0", so as to drive the motor M through the driver D-1. As a result, the mutli-channel tape 200 is rewound because, as mentioned above, a driving mechanism of the device of FIGS. 1A and 1B are operable to rewind the tape 200 when the motor M alone is driven. Thereafter, on the basis of an output from the start point detector 4 linked with the reel (not shown) on which the tape 200 is installed, if the CPU 3 determines at step 302 that the tape 200 is rewound up to its start point 209, the CPU 3 causes the tape 200 to stop (step 303) and then tests at step 304 whether or not the REC/PLAY head RPH and the ERASE head EH are located at respective locations opposite the first channel of the tape 200 (step 304). If it is determined at step 304 that these heads are located such locations (1ch position), the CPU 3 intermittently drives the track switching solenoid SDT at intervals of 0.4 seconds by the use of a cam mechanism, not shown (steps 305 to 307), so that the heads RPH and EH are gradually displaced in one-channel increment. Accordingly, in case that the message exchange apparatus is switched to the AUTO mode after completion of recording the particular message on the eighth channel of the tape 200, when the solenoid SDT is driven once, the heads RPH and EH shift from locations opposite the eighth channel of the tape 200 to locations opposite the first channel, respectively. Upon displacement of the heads to the first-channel-position, the switch SW is turned on and the CPU 3 detects same on the basis of a signal level at the input terminal DB7 (step 304). At subsequent step 309, the CPU 3 waits for a ringing signal (standby mode).

Upon reception of the ringing signal, the program flows to step 310 to switch the level at the output port P13 from logic "1" to logic "0", thereby maintaining a relay Y-1 energized through the driver D-4, so as to form a loop circuit through its contact y-1 to engage the telephone lines L1, L2 with the message exhange device. Then, the ringing signal is terminated and the device is operated in busy mode. Next, at step 311, the CPU 3 sets the output port P50 to logic "0" to turn the light-emitting diode LED1 on to indicate the reception of the incoming call (hereinafter, referred to as 1ch indication). Thereafter, the CPU 3 sets the output port P10 to logic "0" to drive the motor M, and, at the same time, sets the output port P12 to logic "0" so as to energize the solenoid SDP, so that the tape 200 is started to be driven at a normal speed (step 312). Further, the CPU 3 sets the output port P17 from logic "0" to logic "1" to turn the analog switc A-3 on (step 313), so that the outgoing message 201 recorded on the first channel of the tape 200 is reproduced by the REC/PLAY head RPH and transmitted onto the telephone lines L1, L2 through the REC/PLAY switching circuit 13 (which is now operated in PLAY mode in accordance with the output from the output port P16 of the CPU 3), the amplifier 14, the analog switch A-3, and the line transformer LT.

Immediately after the initiation of transmitting the outgoing message 201, the CPU 3 reads a two-digit number (keycode) set by the use of the digital switch 9 for remote control mentioned hereinbelow. More specifically, the CPU 3 performs input processing through the input ports P40 to P43 of the extension I/O port 8, with the outout port P70 set at logic "1", so that the higher digit (the number of "2", for instance) of the digital switch 9 is transferred to the accumulator (not shown) of the CPU 3 and then transferred to the RAM (not shown) to be stored or saved therein. Next, the CPU 3 sets the output ports P70 and P71 at logic "0" and logic "1", respectively, and performs input processing to transfer the first digit of the keycode to the RAM, to save the same digit therein. The CPU 3, which is supplied with the outgoing message 201 through the amplifier 11, the VOX circuit 5, and the OR gate G-2, tests whether transmission of the outgoing message 201 is completed or not (step 315). Upon completion of the outgoing message 201 the CPU 3 causes the tape 200 to stop (step 316) and shuts off the reproducing sound output. Immediately after (or after the delay of about 10 seconds (not shown) for remote control), the CPU 3 cancels the 1ch indication and turns the relay Y-1 off so as to disengage the telephone lines L1, L2 from the device (step 318), and then executes on an after the above-mentioned step 301 so that the tape 200 is rewound up to the start point 209 and the device is set in the standby mode.

Figure 4A:
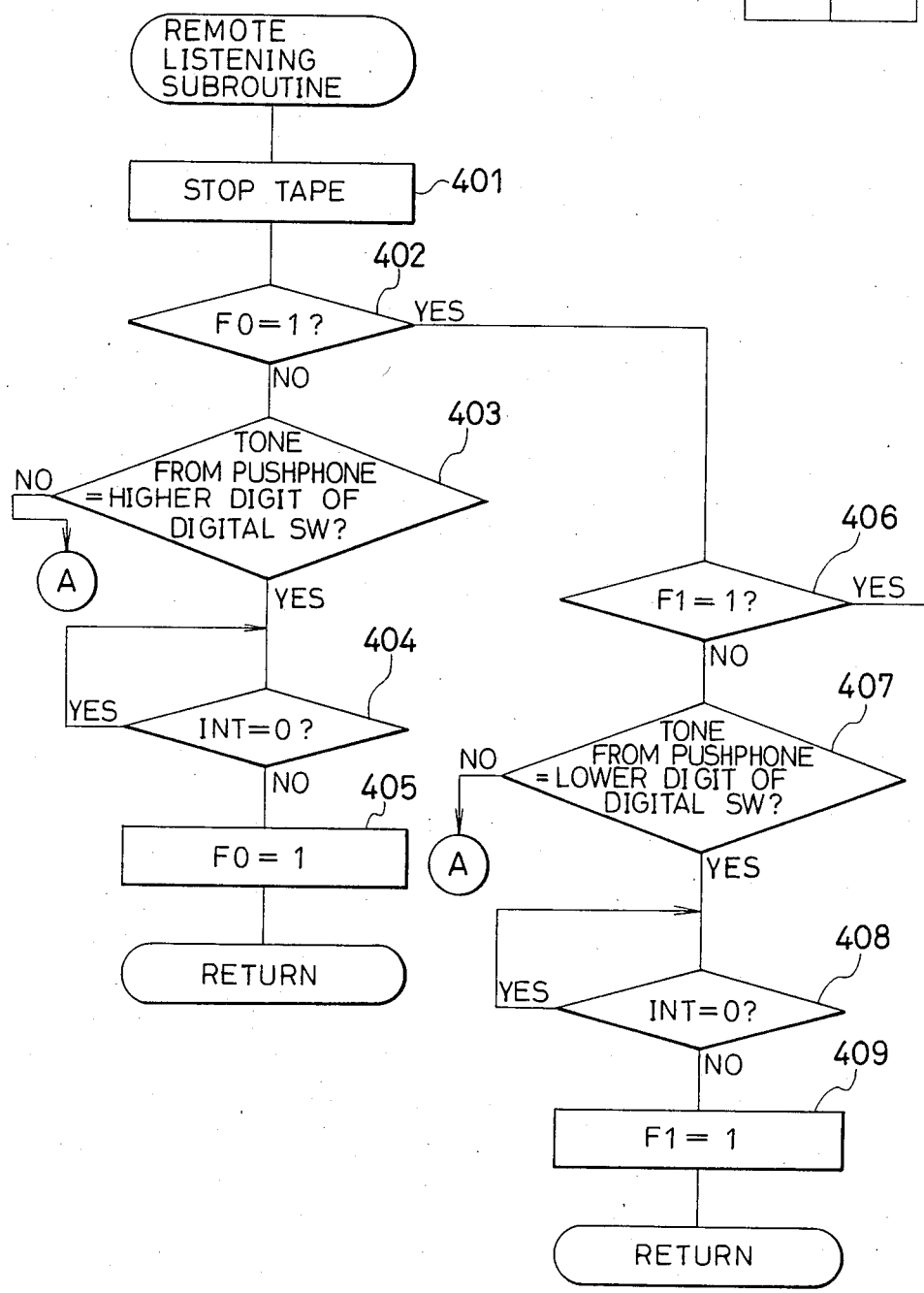
FIGS. 4A and 4B are a flowchart of a control program for a remote listening operation by a particular person for listening to manager instructions directed to him.
Figure 4B:
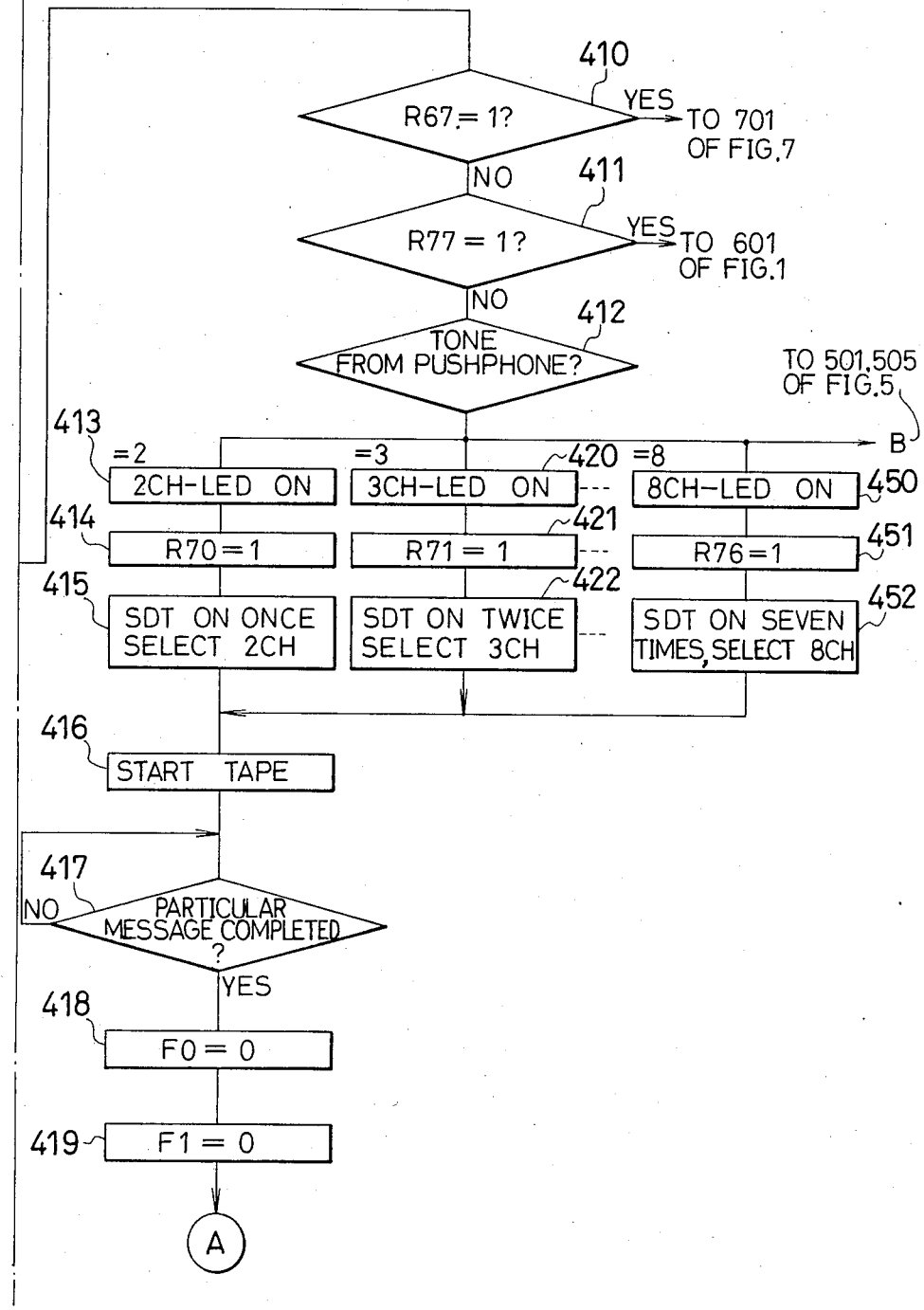

Referring to FIGS. 4A and 4B, the operation of the message exchanging device will be explained, which allows a particular caller such as a salesman to listen to a particular message directed to him by means of remote control.

After calling out the device to listen to the outgoing message 201 directed to both of general and particular callers, first, the particular caller operates buttons of the pushphone to send the two-digit key code to the device. At this time an initial portion of the first digit of the key code is supplied through the line transformer LT and the amplifier 11 to the tone decoder 6 in which such initial portion is decoded into a four-bit signal which is supplied from the tone decoder 6 to the input terminals DB0 to DB3 of the CPU 3. At the same time, the tone decoder 6 generates from its terminal S a strobe signal as an interrupt request which is supplied to the CPU 3 through the OR gate G-1, after the four-bit signal is stabilized. Thus, the program flows to step 401 to cause the tape 200 to stop so as to momentarily block reproduction of the outgoing message 201 so that a subsequent remote control signal is easily identified. At step 402, the CPU 3 tests whether the F0 flag is raise or not. Since at this time the F0 flag is set to logic "0" (to be described later), the program flows to step 403 wherein the CPU 3 tests whether the code of the tone sent from the pushphone by means of the above-mentioned button operation is consistent with the higher digit of the digital switch 9. If the higher digit of the digital switch 9 is set at "2", whereas the particular caller has depressed the "2" button of the pushphone, their codes are consistent with each other, and the program advances to step 404 to test the interrupt terminal INT is set at logic "0". Since the same terminal INT is set to logic "0" so long as a tone is sent from the pushphone, the program preceeds to step 405 upon release of the "2" button of the pushphone. The F0 flag is set to logic "1" at step 405 and then the program exits from this subroutine.

Next, when the particular caller operates the button which corresponds in number to the lower digit of the digital switch 9 to send the corresponding tone an interrupt request is supplied to the CPU 3. At this time, since the F0 flag has been already set to logic "1", the program flows from step 402 to step 406. Because it is determined at step 406 that a F1 flag is set at logic "0" (to be described later), the program flows to step 407 to test whether the tone sent from the pushphone with secondary button operation is consistent with the lower digit of the digital switch 9 or not. If the lower digit is set to the number of "3" and the particular caller depresses the "3" button of the pushphone, their codes are consistent with each other, and thus the program proceeds to step 408 to test whether or not the button of the pushphone is released. Upon release of the "3" button, the F1 flag is set to logic "1" and then the program exits from this routine.

On the other hand, if it is determined that the tone sent from the pushphone is inconsistent with the corresponding digit of the digital switch 9 at either one of steps 403, 406, the program returns to FIG. 3, so that the loop circuit is released and the message exchange device is set its standby mode (steps 301 to 309).

If it is determined that the tone sent by the particular caller is consistent with the predetermined key code, the particular caller is allowed to listen to manager instructions directed to him and recorded on the tape 200, by sending a code assigned to him. For instance, in case that the number of "2" is assigned to a salesman as a particular caller, when he depresses the "2" button of the pushphone, an interrupt request is supplied to the CPU 3, and then the program advances to step 412 through the above-mentioned steps 401, 402, 406 and steps 410, 411 (to be described later). At step 412, the CPU 3 tests which button or number is depressed, in other words, which tone is sent from the pushbutton. If it is determined that the "2" button is depressed, the program flows to step 413, wherein the CPU 3 sets the output port P51 to logic "0" (L level) so as to turn the light-emitting diode LED2 on. As a result, when the manager stays near the message exchange device, he can recognize that his instructions (particular message) are being transmitted or have been already transmitted. At subsequent step 414, the CPU 3 sets the zero bit of a R7 register (hereinafter, referred to as a R70 register) to logic "1" to record that the above-mentioned salesman has listened to the manger instructions. Next, the CPU 3 turns the channel selector solenoid SDT on and off once, at step 415, so as to shift the heads from the locations opposite the first channel of the tape 200 to the locations opposite the second channel. At subsequent step 416, the tape 200, which is momentarily stopped at its intermediate travel position, is caused to start, so that the salesman can listen to a message recorded on the thus started tape 200 immediately or soon, depending on the position at which the tape has stopped. The terminating end of the tape 200 is detected, at step 417, by the VOX function mentioned at step 315, and, when the end of the tape 200 is reached, the F0 and F1 flags are cleared (steps 418, 419) and the 2ch indication is cancelled. Then, the program advances to the above-mentioned step 301 to rewind the tape 200 up to the start point 209, and the device is set in its standby mode after setting the heads RPH, EH at the 1ch position for automatic answering operation.

Further, the message exchange device is operable by the manager from a remote place by the use of an external telephone set, to wholly and successively confirm whether the whole of his instructions directed to respective salesmen have been transmitted, or selectively confirm whether his instructions directed to an individual salesman has been transmitted. With reference to FIG. 5 such operation will be explained.

First, the manager calls out the device as mentioned above, and then depresses the [2], [3]buttons on the pushphone to send the above-mentioned key code while he listens to the general outgoing message 201. Since the transmission of the general outgoing message 201 is blocked, with the telephone lines remain engaged, if he has setn the predetermined key code, the manager can easily confirm whether the key code thus sent is consistent with the predetermined one.

In order to confirm status of all the channels, the manager depresses the "#" button of the pushphone. The tone, which is sent from the pushphone to the device by depressing the "#" button, is tested at the above-mentioned step 412 of FIG. 4. As a result, the program enter step 501 of FIG. 5, wherein the CPU 3 sets the R77 register to logic "1" to store the depressed "#" button. At subsequent step 502, the CPU 3 tests whether or not the depressed "#" button is released. Upon release of the "#" button, a 2-second timer is started at step 503, and a test is effected as to whether or not the thus set period of time of 2 seconds has elapsed at step 504. In the meantime, if the manager depresses any one of the "2" button through the "8" button, the device is set in individual test mode of FIG. 6, as described later, wherein the manager is allowed to individually test the second channel, for instance, by depressing the "2" button of the pushphone.

Now, if the time period of 2 seconds has elapsed, with no further button operation, the program flows to step 505 to test the content of the R70 register. As mentioned above with reference to step 414, the R70 register has been set a logic "1" if the salesman already listened to the associated manager instructions 202 recorded in the second channel of the multi-channel tape 200. Accordingly, if the salesman already listened to the instructions, the program flows from step 505 to step 509 so that the CPU 3 sets respective logic levels at the output port P24 to P27 of the CPU 3 to specify an address A0 to A3 of the sound synthesizing circuit 7, and then supplies a one-shot pulse to the terminal ST to cause the circuit 7 to generate a sound "2" which is sent to the caller or manager through the amplifier 10. The CPU 3 tests whether or not generation of sound "2" is finished on the basis of the level appearing at the terminal BUSY of the circuit 7.

Upon completion of generation of the sound "2", a series of processing similar to the above-mentioned processing is performed to cause the sound synthesizing circuit 7 to generate a subsequent message or a sound "channel message has been already transmitted." As a result, the sound "2-channel message has been already transmitted" is heard by the caller. The CPU 3 also determines completion of transmission of the subsequent message on the basis of the output from the BUSY terminal.

If the 2-channel message has not been transmitted as yet, the R70 is still set at logic "0", and thus the program flows from step 505 to step 506. At steps 506 and 507, a sound "2-channel message has not beeen transmitted as yet" is generated. Then, similar synthesized sounds representative of tested results as to other channels are also generated, respectively (part of which is illustrated by steps 530 through 534).

Thereafter, a 20-second timer is started (step 535) to provide the caller or manager with a period engouth to make his decision as to whether or not he should record a substitute particular message or messages on the multi-channel tape 200. If no button operation is effected by the caller (step 536), the CPU 3 clears the F0 and F1 flags to logic "0", respectively (steps 537, 538), and sets the device in its standby mode.

In addition to the above-mentioned successive confirming mode (FIGS. 5A and 5B), the message exchange device is operable in individual confirming mode to confirm whether particular instructions recorded on a particular channel specified by the caller or manager has been already transmitted. With reference to FIG. 6 the operation of the device in individual confirming mode will be explained below.

Figure 5A:
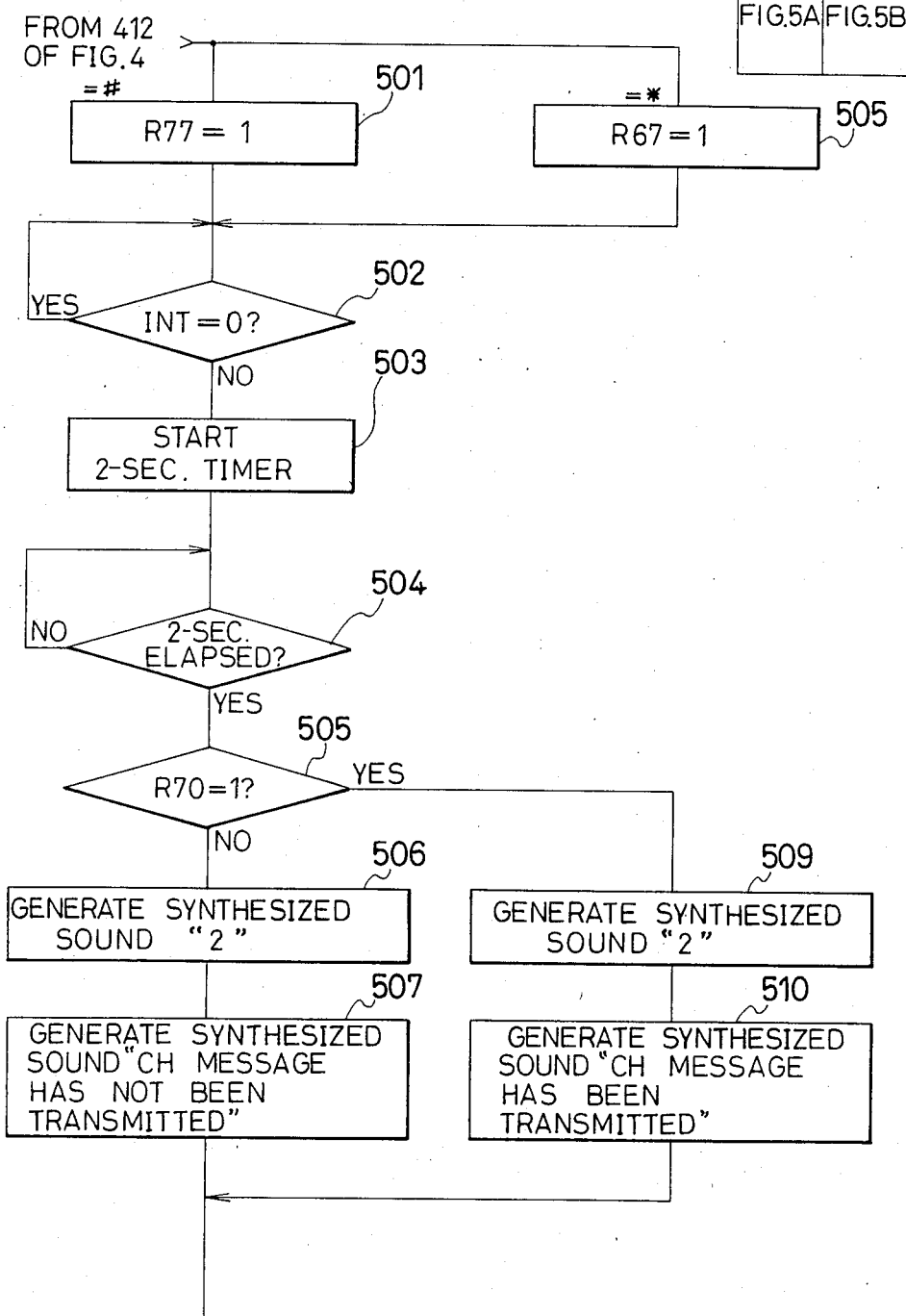
FIGS. 5A and 5B are a flowchart of a control program for another remote listening operation by a manager to successively confirm whether or not his instructions directed to respective particular persons such as salesmen have been transmitted.
Figure 5B:
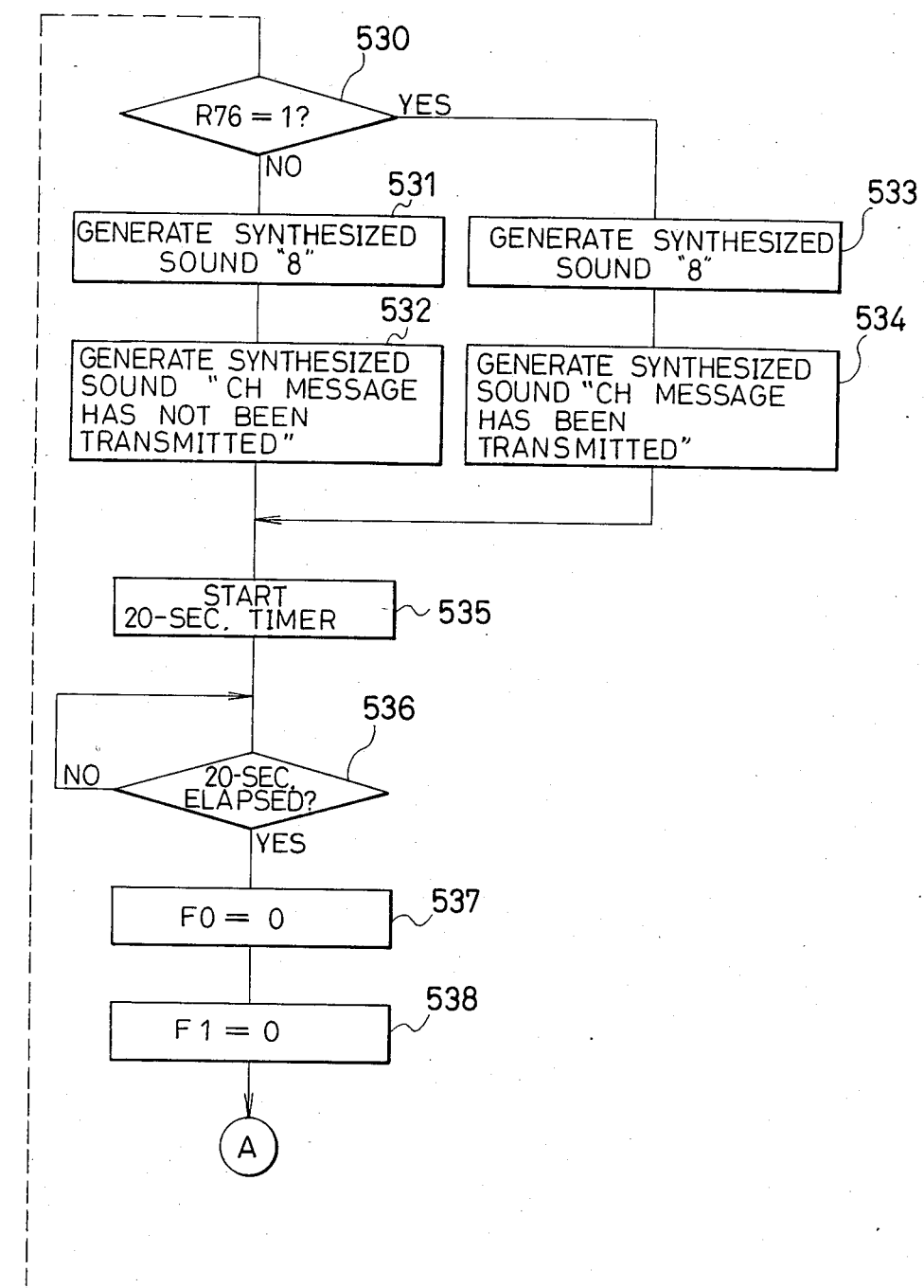
Figure 6:
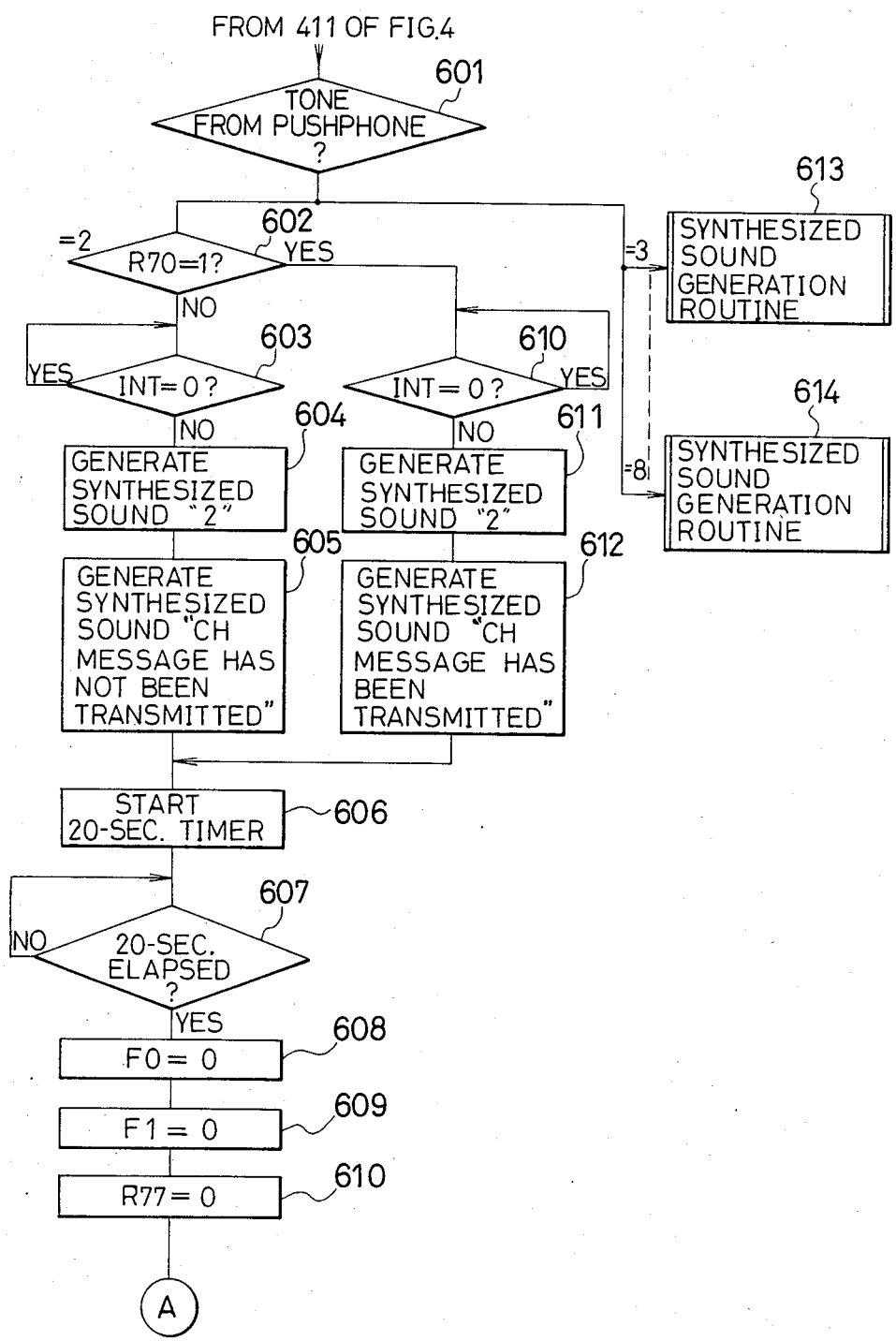
FIG. 6 is a flowchart of a control program for a remote listening operation by the manager to confirm whether or not his instructions directed to an individual particular salesman has been trensmitted.

In successive confirming mode of FIGS. 5A and 5B, the confirming operation as to all the channels can be effected by performing no button operation within 2 seconds (step 504) from the time he depresses the "#" button after transmission of the key code such as "23", with the R77 register set to logic "1" at step 501.

If the caller or manager wishes to confirm state of an individual channel (2-channel, for instance), the caller depresses first the "#" button of the pushphone and then the "2" button after transmitting the key code. As a result, a corresponding tone is transmitted from the pushphone to enable the CPU 3 for interruption, and thus the program flows to step 601 of FIG. 6 through steps 401, 402, 406, 410 and 411. At step 601, the CPU determines what tone is transmitted from the pushphone. If it is determined that the tone corresponding to the "2" button is transmitted, the program flows to step 602 to test the content of the R70 resister.

In case that the particular caller has listened to the message 202 recorded on the second channel of the multi-channel tape 200, the associated R70 register is set to logic "1". Accordingly, if the particular caller has not listened to the 2-channel message 202 as yet, the program proceeds to step 603 to check whether the "2" button is released, and then the synthesized sound "2-channel message has not been transmitted as yet" is outputted from the sound synthesizing circuit 7 at steps 604 and 605. On the otehr hand, if the 2-channel message has been heard or the Register R70 is set to logic "1", the program flows through step 610, which is similar to the above-mentioned step 603, to steps 611, 612 so as to generate the sound "2-channel message has been already transmitted." Upon elapse of 20 seconds (step 607), the CPU 3 clears the F0 and F1 flags and the R77 register, respectively (steps 608 to 610) and sets the message exchange device in standby mode. In a similar manner, the caller or manager can perform confirming operation as to an arbitrary channel of the 3 to 8 channels (part of which is illustrated by steps 613, 614).

Further, the message exchange device is so operable that the manager can record his new instructions through remote control irrespective of whether or not old instructions has been transmitted to the associated particular person. That is, as contrary to the above-mentioned confirming operation executable by depressing the "#" button of the pushphone, the manager can select an arbitrary one of the 2-channel through the 8-channel as a recording channel on which his new message is to be recorded, by depressing the "*" button and then a button of the pushphone corresponding to the selected channel. In the meantime, the device is also adapted to enable the manager to record a substitute outgoing message on the first channel of the tape 200, although a control program therefor is omitted.

Figures 7, 7A:
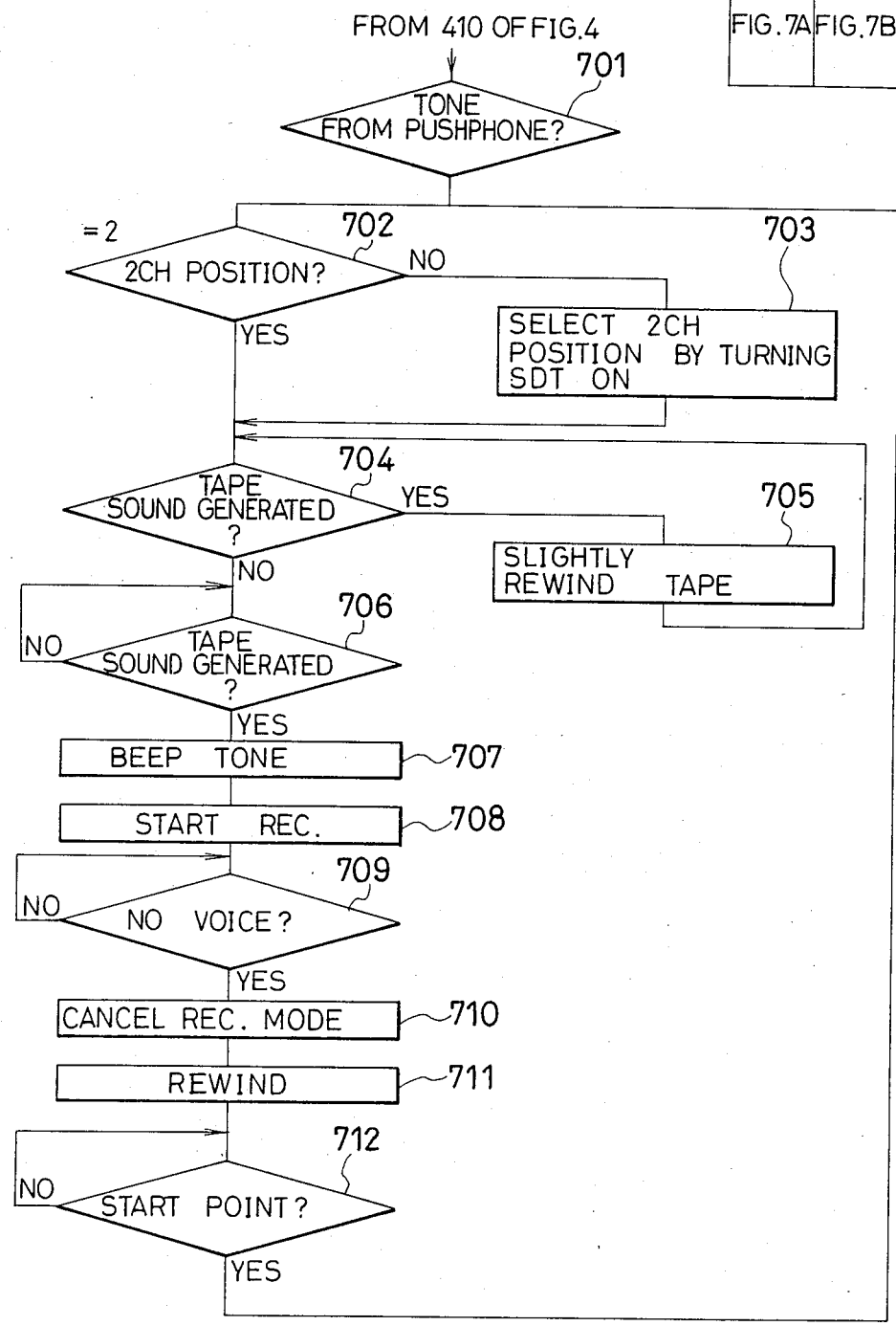
FIGS. 7A and 7B are a flowchart of a control program for a recording operation effected by the manager at a remote location to record his substitute instructions by means of remote operation.
Figure 7B:
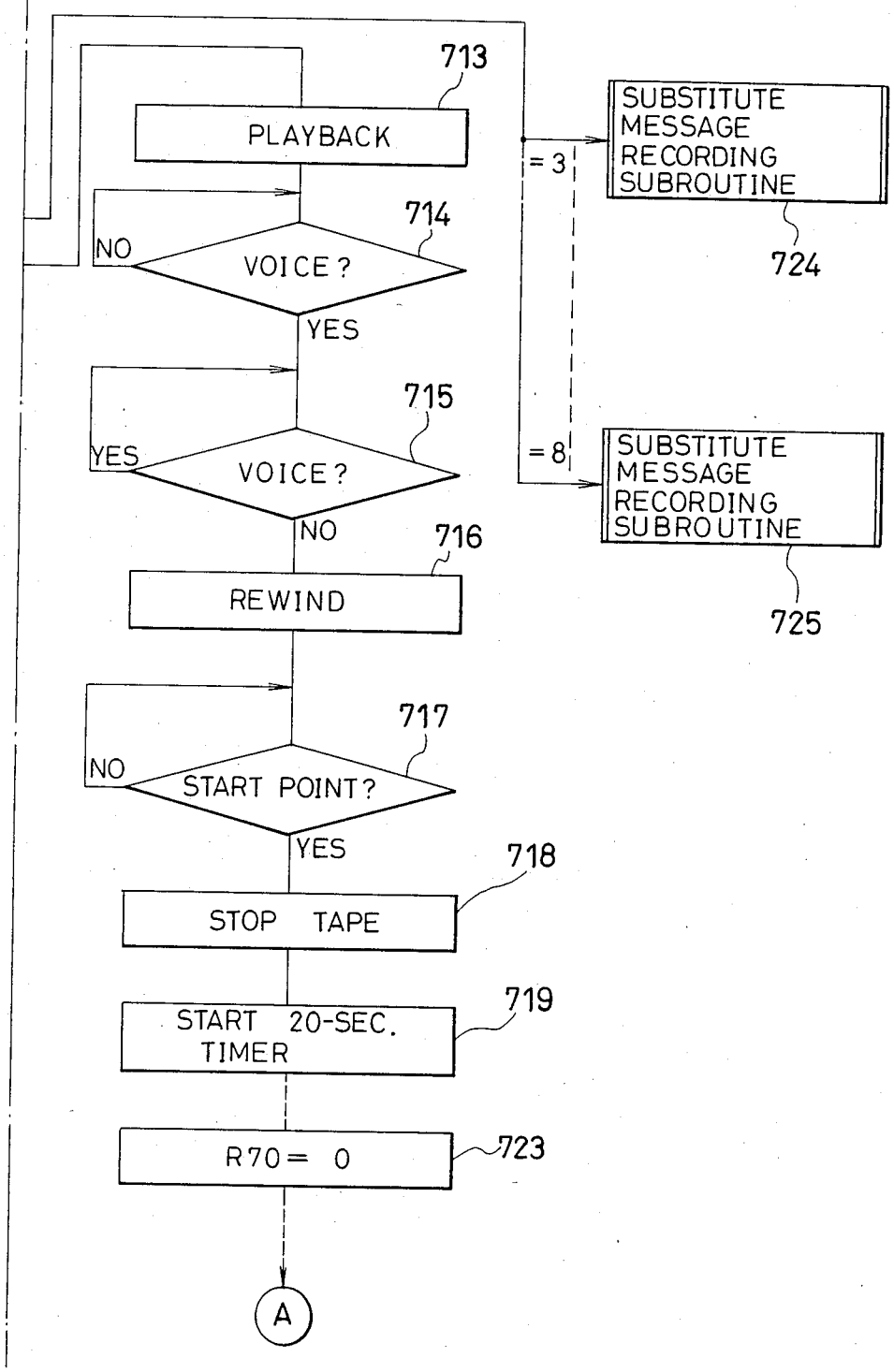

As mentioned above, the CPU 3 is operable to test what tone is transmitted from the pushphone after transmission of the key code, at step 412. If it is determined at step 412 that the tone corresdponding to the "*" button is transmitted, the program advances from step 412 to step 505 in FIG. 5A, to set a R67 register serving as a flag to logic "1", so as to record that the device is operated in its recording mode, and then flows to step 504 through the above-mentioned steps 502, 503. If the caller depresses a button for specifying a channel of the tape 200 (the "2" button, for instance) prior to elapse of 2 seconds, an interrupt request is supplied to the CPU 3. Accordingly, the program proceeds to step 410 through steps 401, 402 and 406, to test the content of the R67 register. As a result, the program advances to step 701 of FIG. 7A to test which button is depressed. If it is determined that the "2" button is depressed, the program advances to step 702 to test whether the heads RPH, EH are positioned at their locations opposite the second channel of the multi-channel tape 200. If the heads are located at locations opposite the first channel, the solenoid SDT is energized once so as to shift the heads to the second channel position, at step 703. At steps 704 and 705, in order to detect the beginning of the manager instructions or particular message 202 shown in FIG. 2, a test is first effective as to whether a reproducing sound is generated, and then the tape 200 is slightly rewound to effect such test repetitively. At step 704, if it is determined that the tape 200 is fully rewound, in other word, non-recorded portion is reached, the program advances to step 706 wherein the CPU 3 determines whether the reproducing sound is generated again, with the tape 200 forwarded (although no step for this forward-operation is illustrated in FIGS. 7A and 7B). Upon the detection of the reproducing sound, i.e., the beginning of the manager instructions, a beep tone is transmitted to the caller (step 707). After listening to the beep tone, the caller starts to speak into the pushphone to send his message therethrough so as to record the same message on the second channel of the tape 200. When the recording of the message is completed and thus voice from the caller is no longer transmitted, the CPU detects same through the VOX circuit 5 (step 709) and cancels recording mode of the device (step 710) and then causes rewinding operation of the tape 200 to start (step 711) so as to enable the caller to listen to or confirm the thus recorded message. Upon detection of the start point 209 of the tape 200 (or when the beginning of the message is detected if the device is so constructed to store a tape position at which the message begins, by the use of a sensor linked with a reel (not shown) on which the tape 200 is installed), at step 712, the CPU 3 switches the operation mode of the device to its PLAY mode (step 713) to reproduce the message, the start of the message-reproduction being detected at step 714. Thereafter, if it is determined at step 715 that reproduction of the message is completed, the tape 200 is rewound up to its start point 209 and stopped (steps 716 to 718), and then a 20-second timer is started (step 719). Although omitted in FIG. 7A, the program advances to step 723 through intervening steps (not shown) to clear the R70 register, which is set to logic "1" when the particular caller has listened to the 2-channel message, because a new message has been now recorded on the same channel of the tape. Thereafter, the CPU 3 sets the device to standby mode. Also, the manager can record new messages on other channels in the same manner as with the second channel (part of which is illustrated by steps 724, 725).

In the above-mentioned embodiment, the program is so prepared that a new messsage or manager instructions can be recorded on selected one channel of the multi-channel tape 200. However, the program may be so modified that new messages are successively recorded on the second channel through the eighth channel of the multi-channel tape 200, respectively, and then the thus recorded messages are reproduced so as to enable the caller or manager to confirm these messages, merely by depressing the "*" button after sending the key code, and then permitting the time period of 2 second to elapse. Although notillustrated in the accompanying drawings, it is easy for those skilled in the art to prepare such program on the basis of the foregoing explanations as to the successive-confirming operation (FIGS. 5A) for wholly confirming whether respective particular persons have listened to manager instructions, and the new-message-recording operation (FIGS. 7A and 7B).

Figure 8:
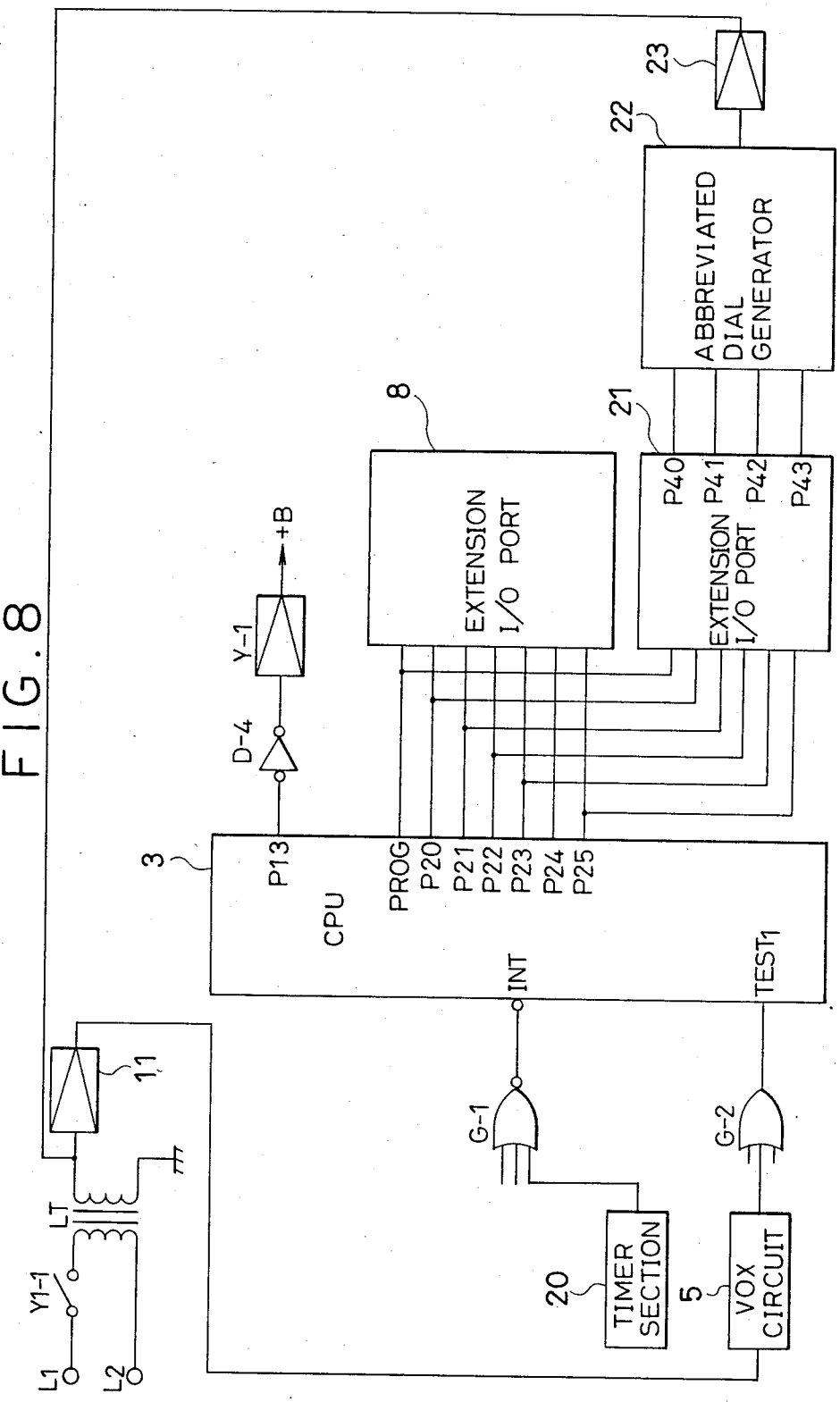
FIG. 8 is a schematic circuit diagram showing an essential part of a modified message exchange device having a paging function to page portable pagers carried by particular persons.

Further, the message exchange device may be so modified that it is operable to call out a salesman through a portable pager carried by him, who has not accessed the device for several hours or more, and failed to listen manager instructions (a particular message) 202–208 which is recorded on the particular channel of the tape assigned to him, so as to request him to listen to such message soon. That is, as shown in FIG. 8, the modified device comprises a timer section 20, an extension I/O port 21, an abbreviated dial generator 22, and an amplifier 23. In FIG. 8, elements, which are common to those of the arrangement of FIGS. 1A and 1B and have not to do with the above-mentioned paging function of the modified device, are not illustrated.

In the abbreviated dial generator 22, various abbreviated dials are registered in such a manner that abbreviated dials "*00" and "*01" are assigned to salesmen relating to the second and third channels of the tape 200, respectively. The abbreviated dial generator 22 is beforehand set to generate a H-level output upon elapse of several hours set by the timer section 20.

Upon elapse of the thus set period of time, the H-level output is generated so that the CPU 3 is enabled for interruption, with all of the above-mentioned input terminals DB0 to DB6 set at L-level. At that time, the program enters a subroutine (not shown) which enables the device to effect processing required for achievement of the specific paging function mentioned above. Although such program is not illustrated, first, the CPU 3 switches the level at the output port P13 from H level to L level, so as to maintain the relay Y-1 energized through a driver D-4. Thus, the relay contact y-1 of the relay Y-1 is closed so that the device of FIG. 8 is engaged with a central office. As a result, a dial tone is transmitted from the central office to the device, which tone being supplied to and detected by the CPU 3 through a line transformer LT, an amplifier 11, a VOX circuit 5, and an OR gate G-2. Upon detection of the dial tone, the CPU 3 tests the respective bits of R70 to R76 registers mentioned above with reference to FIGS. 5A and 5B, so that non-listened channels are selected, on which manager instructions (particular messages) not listened are recorded. The CPU 3 drives the abbreviated dial generator 22 through the output ports P40 to P43 of the extension I/O port 21 so that the respective abbreviated dials corresponding to the selected channels are sequentially transmitted to the central office through the amplifier 23 and the line transformer LT in the order from lower channel to higher channel. As a result, salesmen are called out in sequence through portable pagers carried by them.

If the timer section 20 is of the type wherein several different alarming times are beforehand settable, and the abbreviated dial generator 22 generates its output each time each of the alarming times is reached, the device repetitively effects the above-mentioned calling-out operation when the respective alarming times are reached, so as to request a salesman repetitively, who has not accessed the device even when he was called out through his portable pager, to urgently listen to the manager instructions. Of course, the manager can access direct such person, where required on urgent business.

According to the message exchange device aforementioned, a salesman is solely permitted to utilize the mere single-digit number, which is assigned to him and corresponds to the particular channel of the multi-channel tape (the number "2" for the salesman who uses the second channel, for instance), to send the code for listening to the particular message recorded therein, after sending the predetermined key code to set the device in its remote control mode. However, the device may be so modified that it comprises an extension I/O port similar to that shown in FIG. 8 and digital switches corresponding to that of FIG. 1 and each arranged in a corresponding channel, to allow the respective salesmen to send a coded number consisting of a plurality of digits, so as to listen to the manager instructions.

What is claimed is:

1. Message exchange device connectable to a telephone line for communication between a manager and particular salesmen at at least one remote location comprising:

means for detecting an incoming call;
   a first recording means to reproduce and transmit onto the telephone line a prerecorded outgoing message to a caller upon receipt of an incoming call detected by said detecting means;
   a second recording means which can record only instructions or messages of the manager for any of the salesmen on any channel of a multi-channel recording medium;
   means for receiving a code number sent over the telephone line to the device by any of the salesmen who has called the device and for determining that the number is a special personal number for accessing one of the channels of the multi-channel recording medium for enabling any of said salesmen who sent the special personal number to receive his instruction or message from the manager by playing back the message on the channel accessed;
   memory means for storing information for each channel of the multi-channel recording medium to identify which channels have been accessed and which have not;
   means for receiving a code number sent over the telephone lines to the device by the manager identifying the caller as the manager and thereby allowing him to access the device by remote control;
   means for identifying by remote control whether a specific channel has been accessed or not as determined by said memory means;
   a first announcing means which, when the manager accesses the device for checking from a remote location, announces a "not yet heard" message so long as the specific channel has not been accessed so that a salesman for whom that message was intended has not yet heard the manager's message or instruction from his channel; and
   a second announcing means which, when the manager accesses the device for checking from the remote location, announces an "already heard" message so long as the specific channel has been accessed so that a salesman for whom that message was intended has listened to the manager's instruction of the message from his channel.

2. A device according to claim 1, further including a timer section for generating an output upon elapse of a predetermined period of time, and a dial signal generator for dialing respective numbers for calling out said particular salesmen, to thereby call out at least one of said particular salesmen who has not listened to said manager's instruction when said predetermined period of time has elapsed, so as to request him to listen to the same instruction soon.

* * * * *